Dec. 13, 1955  B. C. ROEHRL ET AL  2,726,482
TOY AUTOMOBILES
Filed May 8, 1951  3 Sheets-Sheet 2
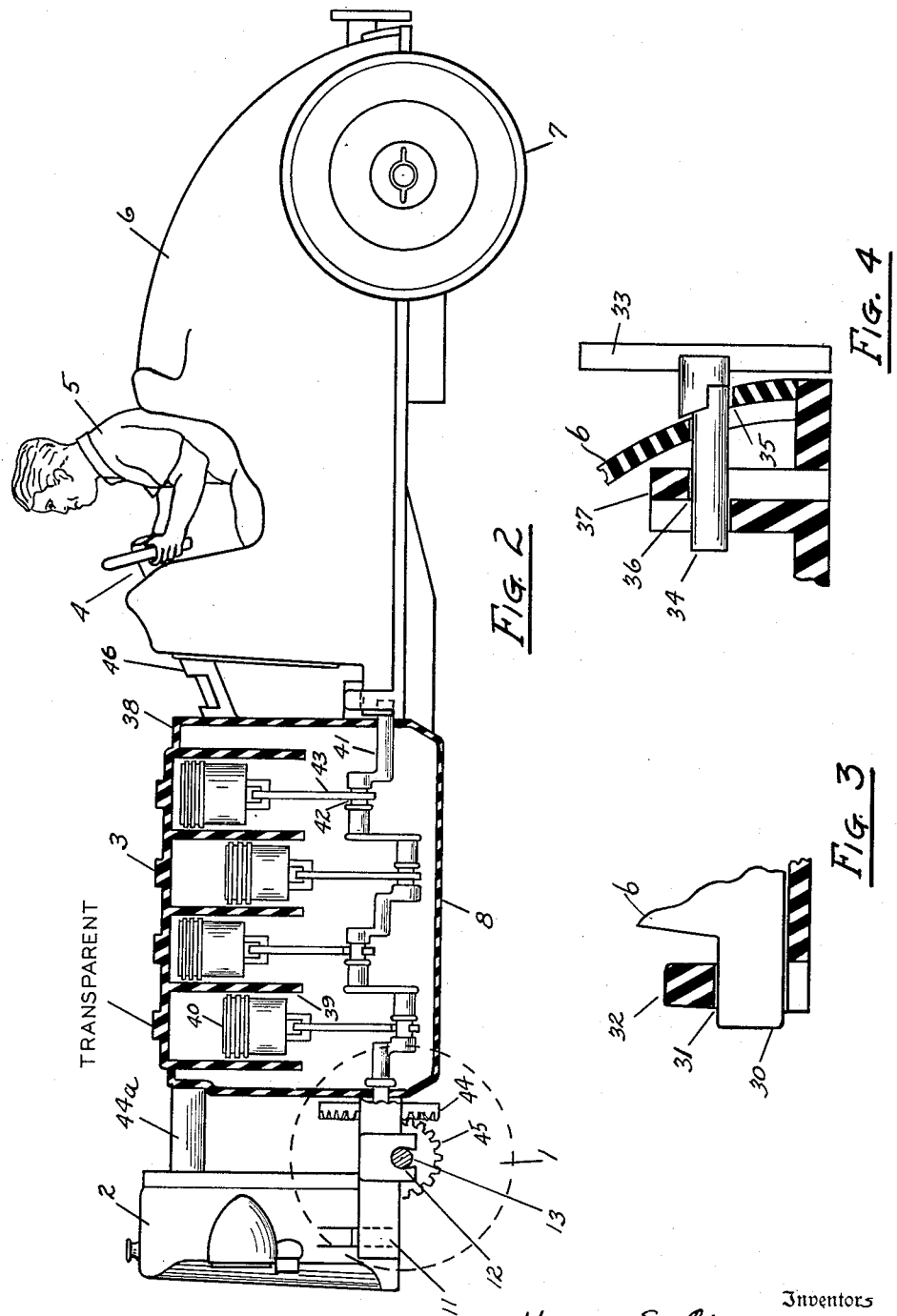
Inventors
Harold S Cloyd
Bruno C Roehrl
By Ralph Hammar Attorney Dec. 13, 1955  B. C. ROEHRL ET AL  2,726,482
TOY AUTOMOBILES Filed May 8, 1951  3 Sheets-Sheet 3

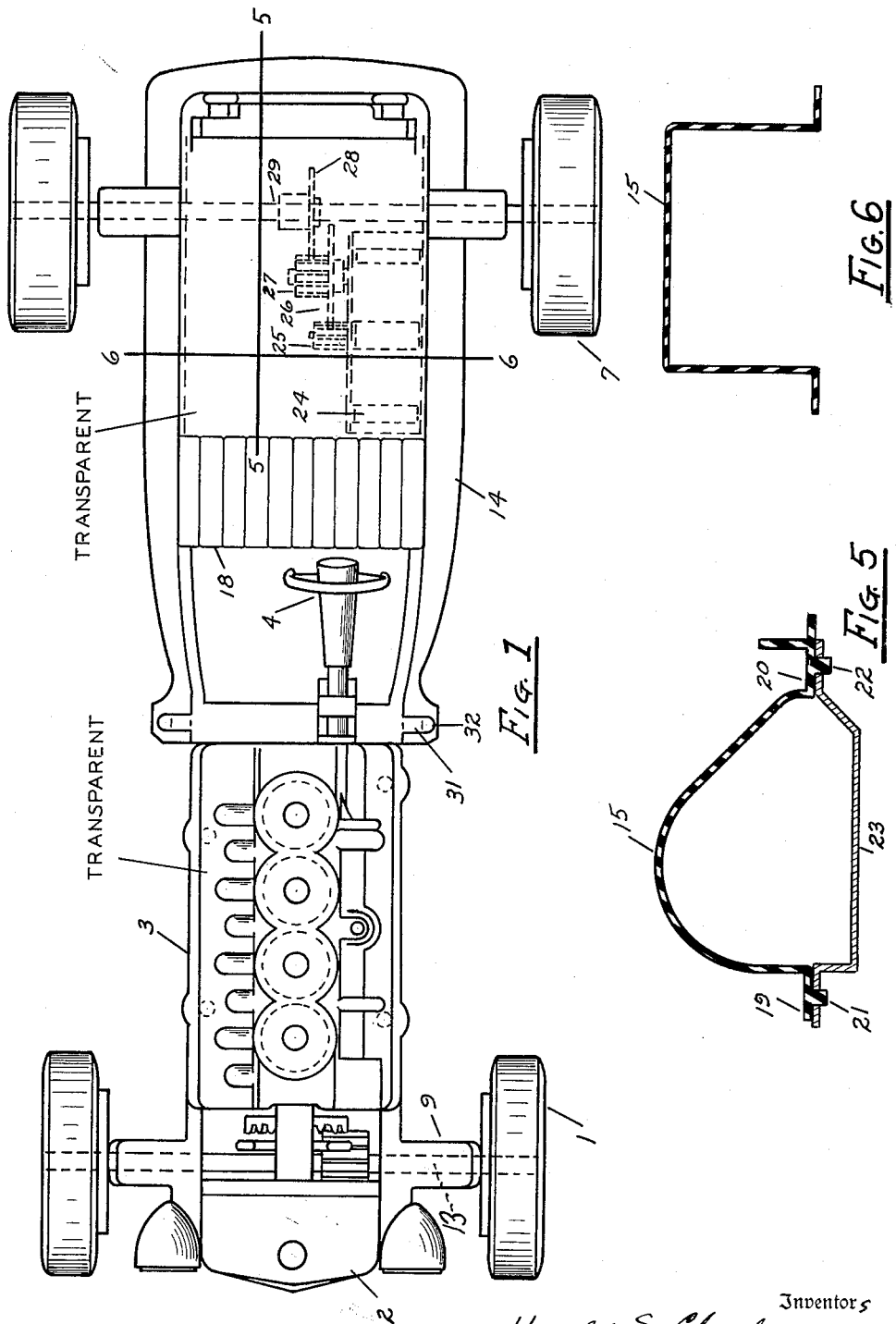

Inventors
Harold S Cloyd
Bruno C Roehrl
By Ralph Hammar Attorney

United States Patent Office 2,726,482
Patented Dec. 13, 1955

2,726,482
TOY AUTOMOBILES

Bruno C. Roehrl and Harold S. Cloyd, Erie, Pa., assignors to Nosco Plastics, Incorporated, Erie, Pa., a corporation of Pennsylvania Application May 8, 1951, Serial No. 225,140

2 Claims. (Cl. 46—204)

This invention is intended to provide a toy automobile for the amusement of children. Features which attract and hold the attention of the children are the transparent engine block with the colored pistons which reciprocate in a realistic manner as the automobile runs, and the transparent housing for the motor and gearing which drives the automobile, the latter being visible when the body is removed to convert the automobile to a stripped-down or hot-rod model. The transparent engine block is particularly attractive, and remains so because the moving parts, the pistons and crankshaft, are sealed in the block and protected from tampering.

Figure 7:
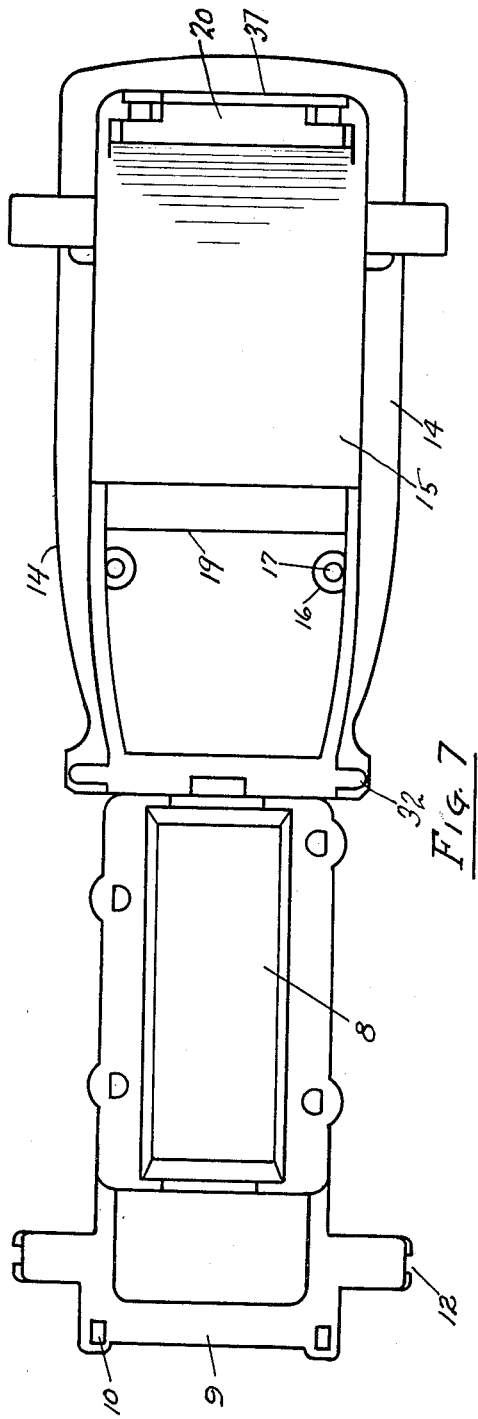
Figure 9:
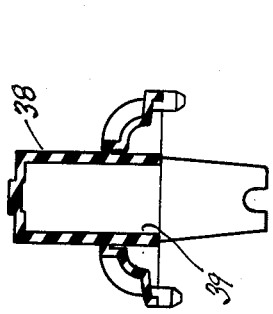
Figure 8:
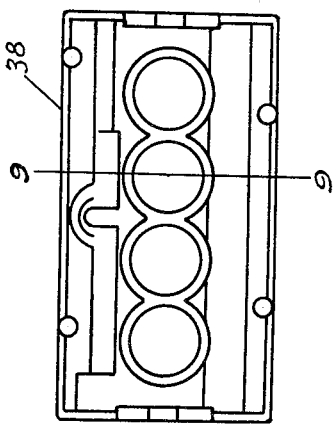

In the accompanying drawings, Fig. 1 is a top view of a toy automobile with the body and driver removed, Fig. 2 is a side elevation of the automobile with the body and driver in place and the engine block broken away to show the crankshaft and pistons, Fig. 3 is a detail of the front mounting for the body, Fig. 4 is a detail of the rear mounting for the body, Figs. 5 and 6 are sections on lines 5—5 and 6—6 of Fig. 1 with the motor and gearing removed, Fig. 7 is a top plan of the molded frame, Fig. 8 is a bottom plan of the engine block, and Fig. 9 is a section on line 9—9 of Fig. 8.

In the drawing, 1 indicates the front wheels, 2 the radiator, 3 the engine, 4 the steering column, 5 the driver, 6 the body, and 7 the rear wheels. These parts are proportioned to simulate a particular design of automobile and, of course, are subject to variation in appearance.

As shown in Fig. 7, the automobile has a unitary frame molded of transparent plastic material. The intermediate portion of the frame is molded in form of a crank case 8 or lower half of the engine. At the front end of the crank case is an integral cross-frame structure 9 having sockets 10 for receiving projections 11 on the under side of the radiator shell and having recesses 12 into which is snapped an axle 13 to which the front wheels 1 are fixed. Extending integrally from the rear of the crank case are spaced longitudinal side frame members 14 connected by an arched section 15, shown in greater detail in Figs. 5 and 6, which serves as a housing for a motor driving the automobile. In front of the arched section 15, there are bosses 16 having sockets 17 for supporting the driver's seat 18. Integral with the front and rear edges of the arched section 15 are cross-members 19 and 20 provided on the under side with integral projections 21 and 22 which extend through and fasten a bottom plate 23 on which the motor for driving the automobile is mounted.

When the bottom plate 23 is secured in place, the arched section 15 provides a transparent housing through which the operation of the motor can be observed. The motor, which could be any of the usual forms of toy motors, comprises an inertia pulley or fly wheel 24 which drives through a pinion 25, a gear 26, and pinion 27 to a gear 28 fixed on the rear axle 29 to which the rear wheels 7 are fixed. With this type of motor, the fly wheel may be brought up to speed by a succession of strokes of the rear wheels on the floor after which the vehicle runs until the momentum of the fly wheel 24 is exhausted.

Ordinarily, the motor housing 15 is enclosed by the body 6 which has projections 30 at the front extending through holes 31 in bosses 32 (Figs. 1, 3) and which is fastened at the rear by a license plate 33 having a pair of integral pins or studs 34 extending through holes 35 in the body and a pair of holes 36 in the cross-member 37 integral with the frame (Fig. 4). The body 6 is readily removable by lifting the rear end after the license plate has been removed. The license plate may then be replaced on the stripped version of the vehicle. This is an important advantage in children's toys where loose parts are likely to be mislaid.

On the crank case is fixed a motor block 38 of transparent plastic which together with the crank case 8 provides a transparent envelope shaped to conform with a conventional automobile engine. The motor block has cylinder walls 39 receiving opaque or colored plastic pistons 40. The lower ends of the walls of the cylinders 39 are located within the side walls of the motor block 38 so that when the motor is viewed from the bottom the cylinders are clearly apparent. At the mating surfaces of the crank case 8 and the engine block 38 is journaled a colored or opaque crank shaft 41 having crank pins 42 connected by connecting rods 43 to the pistons 40. On the front end of the crank shaft is fixed a gear 44 which meshes with a pinion 45 fixed on the front axle 13. Whenever the front wheels are turned, the crank shaft is rotated and the colored pistons 40 are reciprocated in the block 38 thereby producing a realistic operation of an automobile engine. The reciprocation of the piston is particularly attractive to children and yet, because the pistons are completely sealed within the transparent crank case 8 and engine block 38, the pistons are not accessible to tampering. This produces an animated toy peculiarly attractive to children, which has a longer life because the children cannot get access to the moving parts.

At the front of the engine block, a tube 44a extends from the block to the radiator shell simulating the radiator hose and providing a support for the upper end of the radiator. At the back of the motor block extends a seat 46 receiving the steering wheel column 4. The hose connection 44a and steering wheel 4 are fixed in place after the motor block 38 is assembled on the crank case section 8.

The attractiveness of the toy to children is believed to be due to the fact that the operating parts of the motor are clearly visible. The reciprocation of the colored or opaque pistons 40 is particularly attractive. There is also some amusement appeal in the driving gearing for the inertia motor, although this is of secondary attraction.

What is claimed as new is:

1. In a toy automobile vehicle, having a frame mounted on front and rear wheels and a simulated engine, said frame being of transparent material having side frames connected at the front by an integral engine crank case and connected at the rear by an integral arched section, a transparent engine cylinder block fixed to the crank case and forming therewith a transparent envelope simulating an engine, a colored crank shaft journaled within the envelope, colored pistons slidable in the cylinders of the block and connected to the crank shaft by connecting rods, a front axle in the frame carrying the front wheels at least one of which is rigid with the axle, a gear drive from the front axle to the crankshaft whereby as the vehicle runs the crankshaft and pistons visibly simulate the operation of an automotive engine, a motor and rear axle drive unit carried on the upper side of a plate forming a bottom closure for the arch, the operation of said motor and the axle drive being visible through the arch, and rear wheels carried by the rear axle propelling the vehicle and thereby causing turning of the engine crankshaft.

2. In a toy automobile vehicle having a frame mounted on front and rear wheels and a simulated engine, said frame being of transparent material having side frames connected at the front by an integral engine crankcase and connected at the rear by an integral arched section, a transparent engine cylinder block fixed to the crankcase and forming therewith a transparent envelope simulating an engine, a colored crankshaft journaled within the envelope, colored pistons slidable in the cylinders of the block and connected to the crankshaft by connecting rods, a front axle in the frame carrying the front wheels, at least one of which is rigid with the axle, means actuated by the front axle for driving the crankshaft whereby as the vehicle runs the crankshaft and pistons visibly simulate the operation of an automotive engine, a motor and rear axle drive unit carried on the upper side of a plate forming a bottom closure for the arch, the operation of said motor and the axle drive being visible through this arch, and rear wheels carried by the rear axle propelling the vehicle and thereby causing turning of the engine crankshaft.

References Cited in the file of this patent

UNITED STATES PATENTS

| | | |
|---|---|---|
| 1,646,169 | Rosenbaum | Oct. 18, 1927 |
| 1,804,313 | Brubaker | May 5, 1931 |
| 1,820,905 | Block | Sept. 1, 1931 |
| 2,065,208 | Bischof | Dec. 22, 1936 |
| 2,383,441 | Beile | Aug. 28, 1945 |
| 2,418,201 | Spencer | Apr. 1, 1947 |
| 2,421,041 | Swenson | May 27, 1947 |
| 2,540,317 | Baggott | Feb. 6, 1951 |
| 2,551,109 | Fornary | May 1, 1951 |
| 2,607,163 | Lohr | Aug. 19, 1952 |

FOREIGN PATENTS

| | | |
|---|---|---|
| 495,622 | Great Britain | Nov. 16, 1938 |
| 853,075 | France | Mar. 9, 1940 |